United States Patent
Kapinos et al.

(10) Patent No.: US 11,275,825 B1
(45) Date of Patent: Mar. 15, 2022

(54) UPDATING A PASSWORD FOR A CREDENTIAL

(71) Applicant: LENOVO (Singapore) PTE. LTD., New Tech Park (SG)

(72) Inventors: Robert James Kapinos, Durham, NC (US); Robert James Norton, Jr., Raleigh, NC (US); Russell Speight VanBlon, Raleigh, NC (US); Scott Wentao Li, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 110 days.

(21) Appl. No.: 16/731,770

(22) Filed: Dec. 31, 2019

(51) Int. Cl.
*G06F 21/45* (2013.01)
*H04L 9/32* (2006.01)
*H04W 12/06* (2021.01)

(52) U.S. Cl.
CPC ............ *G06F 21/45* (2013.01); *H04L 9/3236* (2013.01); *H04W 12/068* (2021.01)

(58) Field of Classification Search
CPC ..... G06F 21/45; H04W 12/068; H04L 9/3236
See application file for complete search history.

(56) References Cited

U.S. PATENT DOCUMENTS

| 8,413,222 | B1* | 4/2013 | Cooley | H04L 9/0891 726/6 |
| 2011/0041166 | A1* | 2/2011 | Mani | G06F 21/31 726/6 |
| 2017/0180129 | A1* | 6/2017 | Childress | G06F 3/0237 |
| 2017/0187697 | A1* | 6/2017 | Li | G06F 21/46 |
| 2019/0114444 | A1* | 4/2019 | Caldwell | G06F 21/6245 |
| 2020/0380115 | A1* | 12/2020 | Knight | G06F 21/45 |

* cited by examiner

*Primary Examiner* — Nelson S. Giddins
(74) *Attorney, Agent, or Firm* — Kunzler Bean & Adamson

(57) ABSTRACT

For updating the password of a credential with a matching username, methods, apparatus, and systems are disclosed. One method includes storing a set of credentials, each credential in the set comprising a username and password. The method includes detecting an update to a first credential of the set of credentials, the first credential comprising a first username and a first stored password. Here, the update to the first credential indicates a new password to be associated with the first username. The method includes identifying a set of candidate credentials, each candidate credential having a username that matches the first username and a password that matches the stored password and updating the set of candidate credentials to comprise the new password.

20 Claims, 7 Drawing Sheets

UPDATING A PASSWORD FOR A CREDENTIAL

FIELD

The subject matter disclosed herein relates to electronic devices and more particularly relates to globally updating password manager credentials.

BACKGROUND

Various authentication portals use a credential to authenticate a user prior to providing a service (e.g., access). Typically, the credential contains a username and a password. If the user is involved in an Active Directory, a RADIUS environment, or a distributed login (e.g., Google Access) environment, they are presented with many different password screens and sites that may use the same credentials. Password managers are able to store credentials for a number of authentication portals, but cannot detect when the authentication portals use the same authentication service (e.g., Active Directory) on the backend.

BRIEF SUMMARY

An apparatus for updating the password of a credential with a matching username is disclosed. A method and computer program product also perform the functions of the apparatus.

One apparatus for updating the password of a credential with a matching username includes a processor and a memory that stores code executable by the processor. The memory stores a set of credentials, each credential in the set comprising a username and password. The processor detects an update to a first credential of the set of credentials, the first credential comprising a first username and a first stored password. Here, the update to the first credential indicates a new password to be associated with the first username. The processor identifies a set of candidate credentials, each candidate credential having a username that matches the first username and a password that matches the stored password and updates the set of candidate credentials to comprise the new password.

One method for updating the password of a credential with a matching username includes storing a set of credentials by use of a processor, each credential in the set comprising a username and password. The method includes detecting an update to a first credential of the set of credentials, the first credential comprising a first username and a first stored password. Here, the update to the first credential indicates a new password to be associated with the first username. The method includes identifying a set of candidate credentials, each candidate credential having a username that matches the first username and a password that matches the stored password and updating the set of candidate credentials to comprise the new password.

One program product for updating the password of a credential with a matching username includes a computer readable storage medium that stores code executable by a processor, the executable code comprising code to: store a set of credentials, each credential in the set comprising a username and password; detect an update to a first credential of the set of credentials, the first credential comprising a first username and a first stored password, where the update to the first credential indicates a new password to be associated with the first username; identify a set of candidate credentials, each candidate credential having a username that matches the first username and a password that matches the stored password; and update the set of candidate credentials to comprise the new password.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
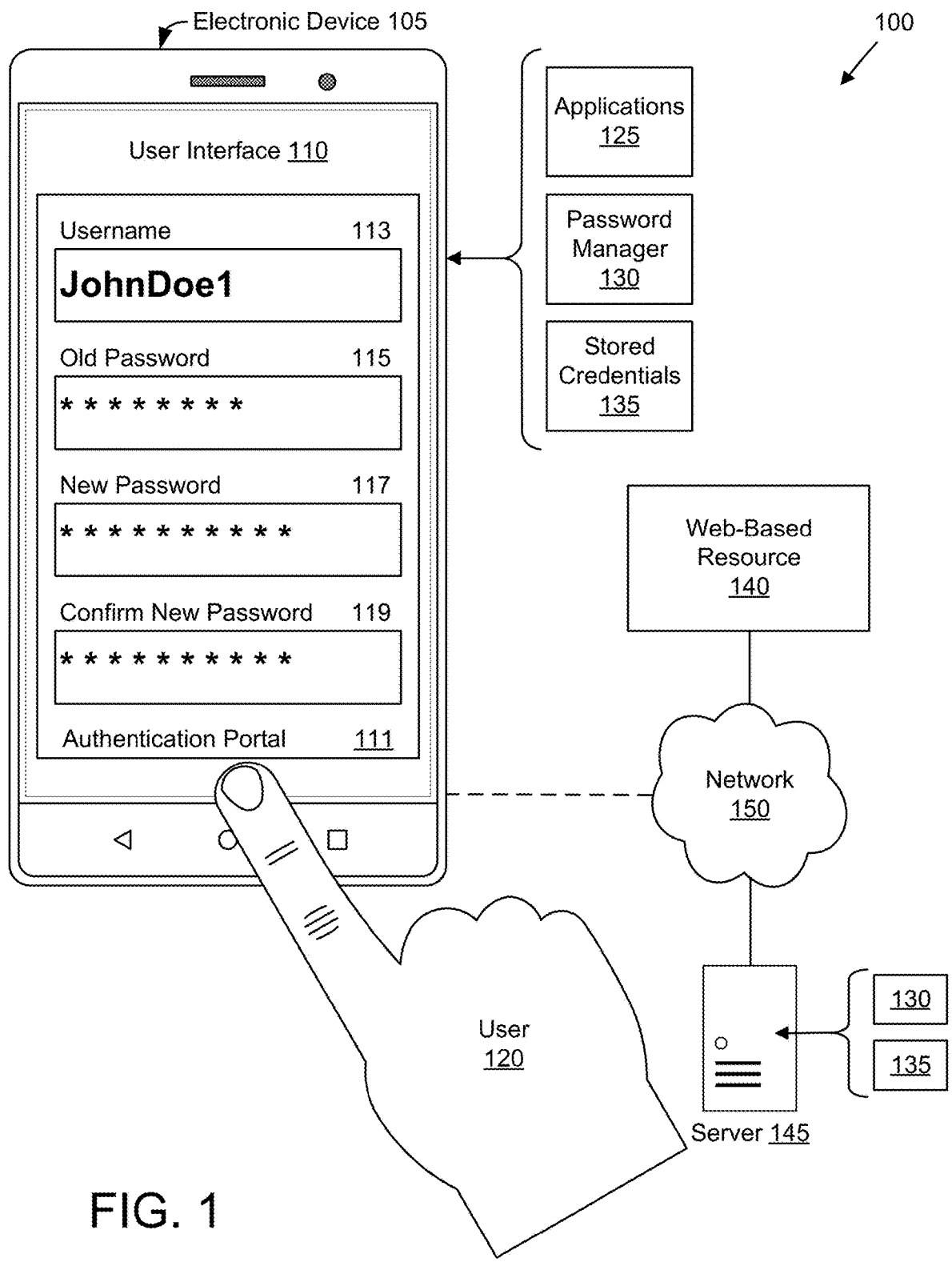
FIG. 1 is a schematic block diagram illustrating one embodiment of a system for updating the password of a credential with a matching username.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For updating the password of a credential with a matching username, methods, systems, and apparatuses are disclosed herein. People have to log into many Web pages and non-web resources. Each of these may have a User ID and Password. However, people use browser based and login based clients with a variety of services which are often connected on the back end by distributed login in services. If the user is involved in an Active Directory, a RADIUS environment, or a distributed login (e.g., Google Access) environment, they are presented with many different password screens and sites that may use the same credentials. Password managers cannot detect that these sites are all the same, so many identities with the same credentials are saved. However, conventional password managers cannot understand that the logins from different subdomains are the same credentials. When the time comes to change passwords, the password manager now has dozens of entries needing update.

Although Active Directory single-sign on helps with multiple entries needing update, it does not handle back end authentication by web front ends. While some browsers save passwords and can tell by zone internet or internet that passwords are the same, but these fail with non-Web resources.

To remedy the above issues with globally updating a password, the improved password manager has the ability to compare IDs (also referred to as "usernames") and passwords to determine when they are the same as others. In various embodiments, when one password is changed, the user is prompted or can check a box to update all matching IDs & old password sets to the new password. Note that the password may be stored as a hash value, such that the improved password manager compares password hashes of the old password to the entries having matching IDs.

If the user wants to add an ID to the auto-update group, she just makes it the same password as all the others. The improved password manager may specifically not update certain passwords when others are changed. In some advanced scenarios, a password group manager could be implemented that would force synchronization of all passwords grouped together at the same time.

Disclosed herein is an apparatus for updating the password of a credential with a matching username. In various embodiments, the apparatus includes a processor and a memory that stores code executable by the processor. The memory stores a set of credentials, each credential in the set comprising a username and password. The processor detects an update to a first credential of the set of credentials, the first credential comprising a first username and a first stored password. Here, the update to the first credential indicates a new password to be associated with the first username. The processor identifies a set of candidate credentials, each candidate credential having a username that matches the first username and a password that matches the stored password and updates the set of candidate credentials to comprise the new password.

In various embodiments, the candidate credentials are associated with different portals. In such embodiments, updating the set of candidate credentials may include: storing both the new password and a stored password, prompting the user to utilize the new password in response to visiting a portal associated with a candidate credential, and replacing the stored password with the new password for the set of candidate credentials in response to receiving user confirmation to utilize the new password with the visited portal.

In some embodiments, storing the set of credentials includes storing the password of a credential as a hash value. In such embodiments, identifying the set of candidate credentials may include comparing a stored hash value of a credential having a username that matches the first username to a hash value of the first stored password. In some embodiments, storing the set of credentials comprises storing the username of a credential as a hash value. In such embodiments, identifying the set of candidate credentials may include comparing a stored hash value of the username of a stored credential to a hash value of the first username.

In certain embodiments, updating the set of candidate credentials includes presenting a list of the candidate credentials to the user and receiving confirmation from the user to replace the stored password with the new password for the set of candidate credentials. In such embodiments, the processor may receive a user-selection of a subset of the candidate credentials in response to presenting the list of candidate credentials, where updating the set of candidate credentials further includes replacing the stored password with the new password for the user-selected subset of the candidate credentials.

In some embodiments, the processor marks the candidate credentials as part of a password group. In such embodiments, updating the set of candidate credentials comprises automatically replacing the stored password with the new password for each candidate credential marked as part of a password group. In certain embodiments, the processor marks a second credential as an independent credential. In such embodiments, identifying the set of candidate credentials comprises ignoring the second credential.

In some embodiments, updating the set of candidate credentials includes storing both the new password and a stored password, detecting authentication failure when logging in to a resource associated with a candidate credential, and reverting to the stored password in response to the authentication failure.

Disclosed herein is a method for updating the password of a credential with a matching username. In various embodiments, the method includes storing a set of credentials, each credential in the set comprising a username and password. The method includes detecting an update to a first credential of the set of credentials, the first credential comprising a first username and a first stored password. Here, the update to the first credential indicates a new password to be associated with the first username. The method includes identifying a set of candidate credentials, each candidate credential having a username that matches the first username and a password that matches the stored password and updating the set of candidate credentials to comprise the new password.

In various embodiments, the candidate credentials are associated with different portals. In such embodiments, updating the set of candidate credentials may include: storing both the new password and a stored password, prompting the user to utilize the new password in response to visiting a portal associated with a candidate credential, and replacing the stored password with the new password for the set of candidate credentials in response to receiving user confirmation to utilize the new password with the visited portal.

In some embodiments, storing the set of credentials includes storing the password of a credential as a hash value. In such embodiments, identifying the set of candidate credentials may include comparing a stored hash value of a credential having a username that matches the first username to a hash value of the first stored password. In some embodiments, storing the set of credentials comprises storing the username of a credential as a hash value. In such embodiments, identifying the set of candidate credentials may include comparing a stored hash value of the username of a stored credential to a hash value of the first username.

In certain embodiments, updating the set of candidate credentials includes presenting a list of the candidate credentials to the user and receiving confirmation from the user to replace the stored password with the new password for the set of candidate credentials. In such embodiments, the method may include receiving a user-selection of a subset of the candidate credentials in response to presenting the list of candidate credentials, where updating the set of candidate credentials further includes replacing the stored password with the new password for the user-selected subset of the candidate credentials.

In some embodiments, the method may include marking the candidate credentials as part of a password group. In such embodiments, updating the set of candidate credentials comprises automatically replacing the stored password with the new password for each candidate credential marked as part of a password group. In certain embodiments, the method may include marking a second credential as an independent credential. In such embodiments, identifying the set of candidate credentials comprises ignoring the second credential.

In some embodiments, updating the set of candidate credentials includes storing both the new password and a stored password, detecting authentication failure when logging in to a resource associated with a candidate credential, and reverting to the stored password in response to the authentication failure.

Disclosed herein is a program product for updating the password of a credential with a matching username. In various embodiments, the program product includes a computer readable storage medium that is not a transitory signal and that stores code executable by a processor. Here, the executable code includes code to: store a set of credentials, each credential in the set comprising a username and password; detect an update to a first credential of the set of credentials, the first credential comprising a first username and a first stored password, where the update to the first credential indicates a new password to be associated with the first username; identify a set of candidate credentials, each candidate credential having a username that matches the first username and a password that matches the stored password; and update the set of candidate credentials to comprise the new password.

In various embodiments, the candidate credentials are associated with different portals. In such embodiments, updating the set of candidate credentials may include: storing both the new password and a stored password, prompting the user to utilize the new password in response to visiting a portal associated with a candidate credential, and replacing the stored password with the new password for the set of candidate credentials in response to receiving user confirmation to utilize the new password with the visited portal.

In some embodiments, storing the set of credentials includes storing the password of a credential as a hash value. In such embodiments, identifying the set of candidate credentials may include comparing a stored hash value of a credential having a username that matches the first username to a hash value of the first stored password. In some embodiments, storing the set of credentials comprises storing the username of a credential as a hash value. In such embodiments, identifying the set of candidate credentials may include comparing a stored hash value of the username of a stored credential to a hash value of the first username.

In certain embodiments, updating the set of candidate credentials includes presenting a list of the candidate credentials to the user and receiving confirmation from the user to replace the stored password with the new password for the set of candidate credentials. In such embodiments, the processor may receive a user-selection of a subset of the candidate credentials in response to presenting the list of candidate credentials, where updating the set of candidate credentials further includes replacing the stored password with the new password for the user-selected subset of the candidate credentials.

In some embodiments, the executable code includes code to: mark the candidate credentials as part of a password group. In such embodiments, updating the set of candidate credentials comprises automatically replacing the stored password with the new password for each candidate credential marked as part of a password group. In certain embodiments, the executable code includes code to: mark a second credential as an independent credential. In such embodiments, identifying the set of candidate credentials comprises ignoring the second credential.

In some embodiments, updating the set of candidate credentials includes: storing both the new password and a stored password, detecting authentication failure when logging in to a resource associated with a candidate credential, and reverting to the stored password in response to the authentication failure.

FIG. 1 depicts a system 100 for updating the password of a credential with a matching username, according to embodiments of the disclosure. The system 100 includes an electronic device 105. In various embodiments, the electronic device 105 includes a user interface 110 for accessing an authentication portal 111.

In the depicted example, the user interface 110 for accessing an authentication portal 111 includes various input fields for updating a password including: a field for a username 113, a field for an old password 115, and a field for a new password 117. In certain embodiments, the authentication portal 111 also includes an input field for confirming the new password 119.

The username 113 identifies an account for a service accessible via the authentication portal 111. When updating a password, the user 120 may be required to enter the old password 115 and the new password 117. As mentioned above, the user 120 may be required to confirm the new password by entering it again in the confirmation field 119.

The electronic device 105 includes one or more applications 125 installed thereon. Certain of the applications 125 may require authentication of the user 120 (e.g., via an authentication portal 111) prior to providing service to the user 120. In this way, the user 120 demonstrates that he or she has a valid account and otherwise meets requirements for accessing the service. In some embodiments, an application 125 may be an authentication client and/or may host its own authentication portal 111. In other embodiments, an application 125 may use web-based authentication, for example via a web browser. As described above, certain resources may use the same authentication back-end, thus using a common credential to authenticate the user 120 across various authentication portals 111. Moreover, the user 120 may access a web-based resource 140 after successful authentication.

In various embodiments, the electronic device 105 may include a password manager 130 that accesses the passwords stored with the credentials 135 in order to optimize authentication of the user 120 via an authentication portal 111. The password manager 130 may store a set of credentials 135, each credential including a username and password. In various embodiments, each credential stored by the password manager is associated with an authentication portal 111. For example, each entry in the set of stored credentials 135 may represent a unique combination of username and authentication portal 111.

When the user 120 updates a password of a stored credential 135, the password manager 130 may store the new password with the combination of username and authentication portal. Moreover, the password manager 130 may autonomously associate the new password with others of the stored credentials 135 as described herein. Note that the password manager 130 may be built into a web browser, built into the OS, or may be a standalone program operating on the electronic device 105.

The electronic device 105 may be any computing device capable of storing a password for authenticating a user 120 via an authentication portal 111. In some embodiments, the electronic device 105 may be a portable computing device, including, but not limited to, a mobile phone, a smartphone, a tablet computer, a laptop computer, a handheld computer, a wearable computer, a gaming console, or the like.

In certain embodiments, the system 100 also includes a server 145 having a password manager 130 and storing passwords for the user 120. In general, the electronic device 105 accesses the server 145 via a network 150. The network 150 may include one or more data networks, including, but not limited to, telephone networks, local area networks, wireless networks, the Internet, and the like.

In various embodiments, the server 145 includes an instance of the password manager 130 and a set of stored credentials 135. Here, the server-based instance of the password manager 130 acts as a web-based password manager which updates the set of stored credentials 135 as described herein.

In some embodiments, the server 145 may be an authenticator, such as a AAA (authentication, authorization, and accounting) server that handles user requests for access to computer resources. In one embodiment, the server 145 may be an Active Directory server. In another embodiment, the server 145 may be a RADIUS (Remote Authentication Dial-In User Service) server.

People use browser based and login based clients with a variety of services which are often connected on the back end by distributed login in services. As such, Active directory servers and/or RADIUS servers may provide back-end authentication services. One example is the ability of the user 120 to use third-party credentials to log into domains and services that are separate from the domain issuing the third-party credentials. Examples of using such third-party credentials include using Facebook credentials to log into third-party services, using Google credentials to log into third-party services, etc.

Accordingly, a central authentication authority is proxied out by a variety of servers, web sites, and resources to provide login services. This allows the user 120 to access many different resources of many different domains, and they proxy login requests over to a central authentication server of one of these various back-end authentication services. In a LAN (local area network) sharing environment with mapped network drives or access server resources, the user 120 logs in through the (local) server not the central authentication server even though the central authentication server (e.g., active directory) is used to validate the presented credentials. The local server presents itself to the electronic device 105 (client) using its own credentials, not those of the active directory.

Note that the combination of username (e.g., user ID) and password is always the same for these distributed login services regardless of the specific portal being accessed. In other words, the central authentication server only has one identity/password for the user, even though it is used by different resources, different websites, different servers, etc.

As such, the same login-domain gets accessed through many different portals. As an example, the user 120 may go through the website 'www.lenovo.com' to log into one resource at Lenovo, but goes through a different website or web-domain to log into other Lenovo resources, such as those of a Lenovo subsidiary or Lenovo joint venture. Importantly, both portals use the same back-end (e.g., corporate Active Directory) to get the authentication info. However, the shared back-end is transparent to the electronic device 105, which has no way of knowing that these portals use the same central authentication server.

As an example, every time the user 120 logs into a website/resource using her Google credentials, the web site/resource proxies the request out to the Google server(s) for the authentication, but the Google server(s) do not identify itself as the authentication authority to the client website/resource. Rather, the authentication remains under the proxy of the web site/resource.

Consequently, the user 120 may use the password manager 130 which matched the saved credentials with the identification of the resource (e.g., authentication portal) the user 120 is logging into; however, the password manager 130 ends up with a multiplicity of entries for what is a single sign-on on the back end.

Many of these authentication authorities require that the user 120 changes her password on a regular basis. For example, a change in password may be mandated after certain time period elapses (every month, every 90 days, etc.), after certain number of logins (credentials only valid for 20 logins, etc.), or the like. Accordingly, the password manager 130 may contain a significant amount of the login credentials being incorrect due to central password being updated, but the password manager 130 being unaware that multiple entries correspond to a single sign-on credential.

Consequently, when the user 120 accesses an authentication portal 111 using login credentials that are now outdated due to the central password being updated, the password manager 130 attempts to log in using the outdated credential resulting in login failure and potential security violations (e.g., lockout).

To remedy this, when the user 120 updates a password on an authentication portal 111 (e.g., website/resource) managed by the password manager 130, the password manager 130 looks for other entries within the stored credentials 135 that have the same username (user ID). These entries having a matching username as the updated credential are referred to as "candidate credentials." In various embodiments, password manager 130 checks the password of the candidate credentials. If the password of a candidate credential matches the old password (i.e., the one being updated), then the password manager 130 may automatically update the password of the matching candidate credentials.

In various embodiments, the password manager 130 may save the credential pair as a username and hash of the password to improve security. Here, the password manager 130 may use the same hashing algorithm for all saved passwords. Alternatively, the password manager 130 may use a variable hashing algorithm for all saved passwords whose mechanism is known such that the password manager 130 can create a temporary password hash for the candidate credential using the old password of the updated credential. Here, if the temporary password hash matches what is stored with the candidate credential, then the password manager 130 determines that the password of the candidate credential matches the old password. In certain embodiments, the password manager 130 may save the username of the credential pair as a hash to further improve security. In such embodiments, the password manager 130 may use the above techniques to identify candidate credentials using the username hash of the updated credential (e.g., finding entries of the stored credentials 135 whose username hash matches the username hash of the updated credential).

In some embodiments, the user 120 may indicate whether a stored password is part of credential group using same central authenticator. In certain embodiments, the password manager 130 may predict that a stored password as part of credential group and prompt the user to confirm the same. Here, such prediction may be made using, e.g., an identity of the authentication portal 111, metadata associated with the authentication portal 111, content (e.g., text or images) displayed within the user interface 110 accessing the authentication portal 111, or the like.

Similarly, the user 120 may signal the password manager 130 to exclude certain entries of the stored credentials 135 from being automatically updated when a credential having the same username and password is updated. For example, the user 120 may recognize that unrelated authentication portals 111 (e.g., authentication portals 111 not sharing the same backend authenticator) may use the same username and signal the password manager 130 to prevent such independent credentials from being improperly updated. Such user feedback may allow a learning algorithm associated with the password manager 130 to differentiate between credentials with same username, but associated with different active directories.

The password manager 130 may flag a stored credential 135 if the password manager 130 predicts the credential to be a single sign-on credential or the credential sharing the same backend authenticator. Similarly, the password manager 130 may store an indication with certain of the stored credential 135 that are to be updated together.

When the password manager 130 detects an update to a password entered into an authentication portal 111, the password manager 130 may ask the user 120 whether the stored credential 135 for that portal is to be updated. In certain embodiments, the password manager 130 may present a list of portals and ask the user 120 whether stored credentials 135 for the list of portals are to be updated as well.

Figure 2:
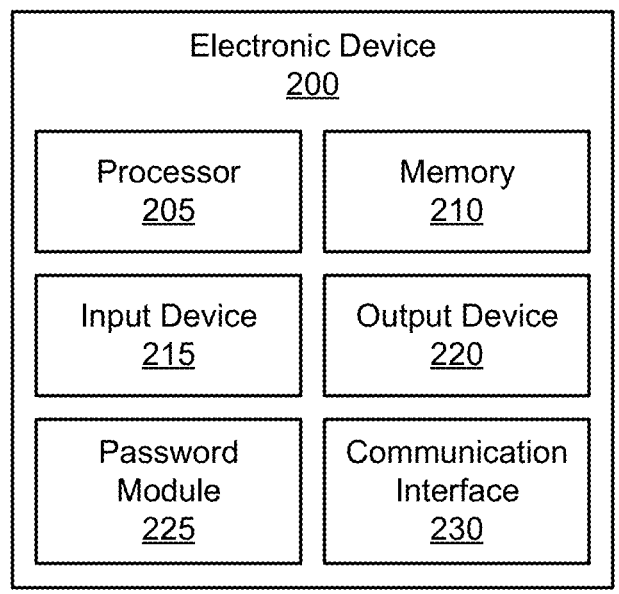
FIG. 2 is a schematic block diagram illustrating one embodiment of an apparatus for updating the password of a credential with a matching username.

FIG. 2 depicts an electronic device 200 for updating the password of a credential with a matching username, according to embodiments of the disclosure. The electronic device 200 may be one embodiment of the electronic device 105. The electronic device 200 may include a processor 205, a memory 210, an input device 215, an output device 220, a password module 225, and communication interface 230. In certain embodiments, the electronic device 200 may not contain the input device 215 and/or output device 220. In certain embodiments, the electronic device 200 does not contain the communication interface 230.

The electronic device 200 may include a body or an enclosure, with the components of the electronic device 200 being located within the enclosure. In various embodiments, the electronic device 200 includes a battery or power supply that provides electrical power to the electronic device 200. Moreover, the components of the electronic device 200 are communicatively coupled to each other, for example via a computer bus. In certain embodiments, the input device 215 and/or output device 220 may be located outside the enclosure and connectively coupled to other components of the electronic device 200.

The processor 205, in one embodiment, may comprise any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a FPGA, or similar programmable controller. In some embodiments, the processor 205 executes instructions stored in the memory 210 to perform the methods and routines described herein. The processor 205 is communicatively coupled to the memory 210, the input device 215, the output device 220, the password module 225, and the communication interface 230.

The memory 210, in one embodiment, is a computer readable storage medium. In some embodiments, the memory 210 includes volatile computer storage media. For example, the memory 210 may include a random-access memory ("RAM"), including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to updating the password of a credential with a matching username. For example, the memory 210 may store a security policy, a set of one or more authorized fingerprints, a set of one or more fingerprint captures, a set of one or more user profiles, and the like. In some embodiments, the memory 210 also stores program code and related data, such as an operating system operating on the electronic device 200 and one or more applications. In one embodiment, the password module 225 may be embodied in a software application (or set of software applications) stored in the memory 210 and operating on the electronic device 200 (e.g., running on the processor 205).

The input device 215, in one embodiment, may comprise any known computer input device including a touch panel, a button, a keyboard, and the like. In some embodiments, the input device 215 (or portion thereof) may be integrated with the output device 220, for example, as a touchscreen or similar touch-sensitive display. In some embodiments, the input device 215 comprises two or more different devices, such as a button and a touch panel.

In various embodiments, the input device 215 comprises one or more sensors for capturing the fingerprint of a user touching the touch surface. In certain embodiments, these sensors may also be used to identify the location on the touch surface that the users touching, identify a number of digits touching the touch surface, etc. so that the user can interact with the electronic device 200 via touch. In some embodiments, the input device 215 includes capacitive sensors for capturing the fingerprint. In some embodiments, the input device 215 includes ultrasonic sensors for capturing the fingerprint. In other embodiments, the input device 215 includes optical sensors and/or thermal sensors for capturing the fingerprint. In other embodiments, The output device 220, in one embodiment, is configured to output visual, audible, and/or haptic signals. In some embodiments, the output device 220 includes an electronic display capable of outputting visual data to a user. For example, the output device 220 may include an LCD display, an LED display, an OLED display, a projector, or similar display device capable of outputting images, text, or the like to a user. In other embodiments, the output device 220 (and electronic device 200) does not include an electronic display.

In certain embodiments, the output device 220 includes one or more speakers for producing sound, such as an audible alert or notification. In some embodiments, the output device 220 includes one or more haptic devices for producing vibrations, motion, or other haptic output. As mentioned above, all or portions of the output device 220 may be integrated with the input device 215. For example, the input device 215 and output device 220 may form a touchscreen.

As another example, the input device 215 and output device 220 may form a touch-sensitive display that includes haptic response mechanisms. In some embodiments, the output device 220 may be located near the input device 215. For example, the microphone, camera, speakers, and touchscreen may all be located on a common surface of the electronic device 200. The output device 220 may receive instructions and/or data for output from the processor 205 and/or the password module 225.

Figure 3:
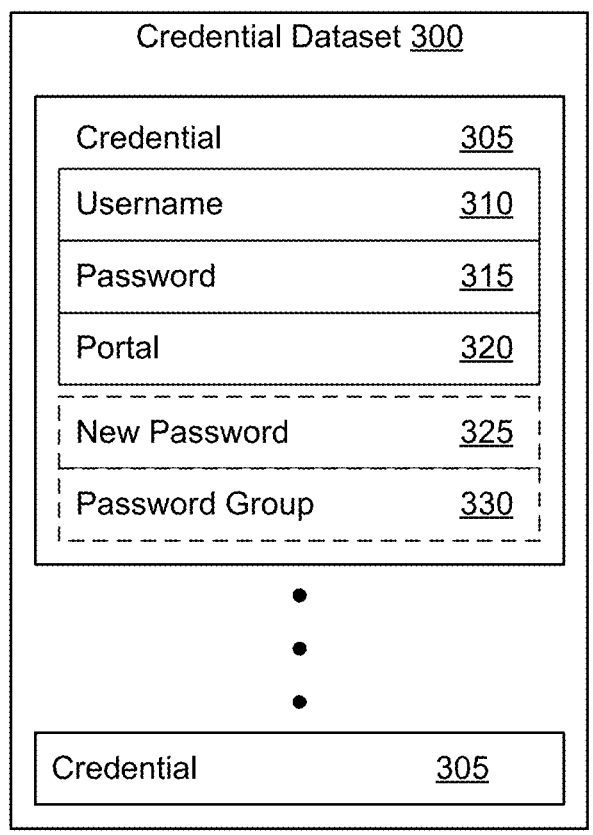
FIG. 3 is a block diagram illustrating one embodiment of a stored set of credentials.

The password module 225, in one embodiment, is configured to stores a set of credentials, each credential in the set comprising a username and password. One example of storing credentials is depicted at FIG. 3. The password module 225 is configured to detect an update to a first credential of the set of credentials, the first credential comprising a first username and a first stored password, wherein the update to the first credential indicates a new password to be associated with the first username.

Upon detecting the credential update, the password module 225 identifies a set of candidate credentials, each candidate credential having a username that matches the first username and a password that matches the stored password, and updates the set of candidate credentials to include the new password. One implementation of the password module 225 is discussed in further detail below with reference to FIG. 4. Note that the password module 225 may be a client-side implementation of the password manager 130. Alternatively, the password module 225 may be a server-site implementation of the password manager 130.

In various embodiments, the password module 225 detects an update to stored password. Here, the stored password is associated with a username and an authentication portal. The authentication portal is a front end for user authentication and may proxy user authentication to a central authenticator, as discussed above. Alternatively, the authentication portal may be an independent authenticator or may use a separate center authenticator from authentication portals associated with stored passwords. Note that the authentication portal may be for a web-based or a non-web-based resource.

As used herein, the combination of stored password, username, and authentication portal is referred to as a "credential" or "authentication credential." As used herein, the password refers to a shared secret known to the user (e.g., user 120) and the authenticator, whereas the username represents a public identity used by the user to login. The authenticator confirms that the user is authorized to access a resource by comparing the username and password to a list of username/password combinations of authorized users for the resource.

Upon detecting an update to stored password, the password module 225 may ask the user if the stored password is to be updated. If the user confirms that the stored password is to be updated, then password module 225 updates the credential associated with the stored password to include the new (updated) password. Additionally, the password module 225 searches through a credential database for credentials having the same username is the updated credential. The password module 225 compiled a set of candidate credentials, each candidate credential having the same username as the updated credential and storing the same password as the old stored password of the updated credential.

In one embodiment, the password module 225 asks the user whether the candidate credentials are to be updated as well. For example, the password module 225 may present a list of candidate credentials (e.g., a list of authentication portals of the candidate credentials) and updates one or more of the candidate credentials based on user feedback. In another embodiment, the password module 225 automatically updates the candidate credentials to store the new password without prompting the user for confirmation. Alternatively, the password module 225 may store the new and old passwords for each of the candidate credentials. Here, the password module 225 may ask the user whether the candidate credentials should be updated to use the new password when the user visits the authentication portal associated with the candidate credential.

Thereafter, the password module 225 may provide the new credential when logging into a resource associated with the candidate credential. Should authentication fail using the new password, the password module 225 may revert to the old password.

The communication interface 230 may include hardware circuits and/or software (e.g., drivers, modem, protocol/network stacks) to support wired or wireless communication between the electronic device 200 and another device or network, such as the network 150. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

FIG. 3 depicts a credential dataset 300 for updating the password of a credential with a matching username, according to embodiments of the disclosure. In various embodiments, the credential dataset 300 may be one implementation of the stored credentials 135 discussed above. The credential dataset 300 may be created by an electronic device, such as the electronic device 105, the password manager 130, the server 145, the computing device 200, and/or the password module 225. In one embodiment, the credential dataset 300 is stored on a local device, for example, within the memory 210. In another embodiment, the credential dataset 300 may be stored in a networked device, such as a password management server, and accessed by a local device. In some embodiments, the credential dataset 300 is associated with a specific user. In other embodiments, the credential dataset 300 is associated with multiple users. Although not depicted, each entry 305 may indicate a user or account (separate from the username 310) when the credential dataset 300 is associated with a specific user.

As depicted, the credential dataset 300 includes various credential entries 305. The credential entries 305 each store a username 310 (e.g., user identification), a password 315, and an authentication portal 320 associated with the username/password pair. In various embodiments, each credential entry corresponds to a unique combination of username 310 and authentication portal 320. As discussed above, authentication portals that share the same backend authenticator may use a single username/password pair for all logins to the authenticator, regardless of which portal is used. Thus, certain of the authentication portals 320 may be linked in a manner not visible to the device managing the credential dataset 300.

When a user accesses a portal stored in the credential dataset 300 and needs to authenticate, the credential dataset 300 may return a username 310 and corresponding password 315 for authenticating the user. Moreover, whenever the user updates a password, as described herein, the credential dataset 300 may store the new password 325. Here, the new password 325 may be stored along with the old password 315.

In certain embodiments, an entry 305 may store an indication 330 of whether or not the entry is part of a password group. As used herein, a "password group" refers to a set of two or more entries 305 that are known to be linked, such that their passwords are to be updated at the same time. In one embodiment, the user may indicate the linking, wherein the password group indicator 330 is set to a value indicating the entry 305 is part of a password group. In another embodiment, a password manager may discover that certain passwords sharing the same username 310 always update their passwords 315 to the same new value. Thus, learned correlation may result in the password manager setting the password group indicator 330 to a value indicating the entry 305 is part of a password group.

In certain embodiments, the password group indicator 330 is a one-bit flag. In one embodiment, setting the flag indicates that the password is part of a group, wherein all entries marked as part of a group are updated at the same time whenever the user updates a member of the group. In another embodiment, setting the flag indicates that the password is not a part of a group (i.e., an "independent" password). In such embodiments, the entry 305 is ignored whenever another entry 305 having the same username 310 is updated to a new password.

In other embodiments, the password group indicator 330 stores a group identifier. In this way, different password groups may be distinguished. Accordingly, whenever an entry 305 is updated to a new password 325, the new password 325 is automatically stored to any entry 305 having the same group identifier. Note that a password manager may continue to look for new members of a password group by identifying additional entries 305 having the same username 310 as the updated entry 305.

Figure 4:
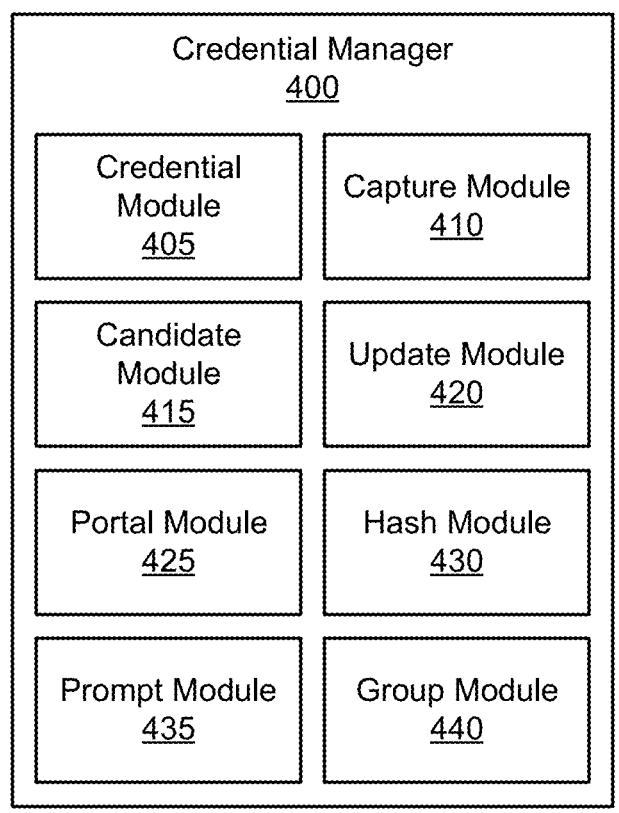
FIG. 4 is a schematic block diagram illustrating one embodiment of an authentication controller for updating the password of a credential with a matching username.

FIG. 4 depicts a credential manager 400 for updating the password of a credential with a matching username, according to embodiments of the disclosure. The credential manager 400 may be one embodiment of the password module 225, discussed above. Further, the credential manager 400 may be implemented on an electronic device, such as the electronic device 105 and/or electronic device 200. In one embodiment, the credential manager 400 may be implemented as a hardware circuit comprising custom VLSI circuits or gate arrays, off-the-shelf semiconductors such as logic chips, transistors, or other discrete components. The credential manager 400 may also be implemented in programmable hardware devices such as field programmable gate arrays, programmable array logic, programmable logic devices or the like.

As depicted, the credential manager 400 includes a plurality of modules. Specifically, the credential manager 400 may include a credential module 405, a capture module 410, a candidate module 415, and an update module 420. In certain embodiments, the credential manager 400 may also include one or more of: a portal module 425, a hash module 430, a prompt module 435 and a group module 440. The modules 405-440 may be implemented as hardware, software, or a combination of hardware and software.

The credential module 405, in one embodiment, is configured to store a set of credentials, each credential in the set comprising a username and password. In various embodiments, the credentials are associated with different portals. The credential module 405 may store the set of credentials in a dataset, such the credential dataset 300.

As new usernames are submitted by the user (e.g., as different portals are visited), the credential module 405 may expand the set of credentials to include the new username/password pairs and associated portal(s). In some embodiments, storing the set of credentials includes storing the password of a credential as a hash value. In some embodiments, storing the set of credentials comprises storing the username of a credential as a hash value. In various embodiments, the credential module 405 may mange a set of credentials, such as the credentials dataset 300.

The capture module 410, in one embodiment, is configured to detect an update to a first credential of the set of credentials, the first credential comprising a first username and a first stored password. Here, the update to the first credential indicates a new password to be associated with the first username. The capture module 410 captures the new password for the first credential.

The candidate module 415, in one embodiment, is configured to identify a set of candidate credentials, each candidate credential having a username that matches the first username and a password that matches the stored password. In various embodiments, the candidate module 415 may search a credential dataset 300 for entries having the same username as the first credential (i.e., the credential that was updated).

As discussed above, the password of a credential may be stored as a hash value. In certain embodiments, the username of a credential may also be stored as a hash value. In such embodiments, the candidate module 415 replicates the hashing algorithm and checks whether a hash value of the old password for the first credential matches hash values of stored credentials having the same username (or username hash) as the first credential.

The update module 420, in one embodiment, is configured to update the set of candidate credentials to comprise the new password. In certain embodiments, the update module 420 may access the credential dataset 300 to add a new password 325 to an entry having the same username as the first credential. In some embodiments, both the the new password and an old password are stored. Here, the credential manager 400 may revert to the old stored password in response to authentication failure with the new password. In other embodiments, the update module 420 replaces the old stored password with the new password. As discussed above, the update module 420 may automatically update the set of candidate credentials when the first credential is updated, may prompt the user to update the set of candidate credentials (e.g., when the first credentials updated), may update each candidate credential when it is associated portal is visited, and the like.

The portal module 425, in one embodiment, is configured to identify an authentication portal associated with a credential. As discussed above, each entry in the credential dataset 300 may be associated with an authentication portal. As used herein, "authentication portal" refers to an interface for authenticating a user (e.g., authentication with respect to a certain resource). In certain embodiments, an authentication portal may be an internet-based interface, for example displayed via a web-browser. In other embodiments, an authentication portal may be a non-web-based interface, for example a client application running on the device. Here, the portal module 425 may track credentials used in both web-based and non-web-based authentication portals.

In various embodiments, both the new password and the old password are stored for a candidate credential and the portal module 425 prompts the user to utilize the new password in response to visiting the authentication portal associated with the candidate credential. In response to receiving user confirmation to utilize the new password with the visited portal (e.g., and/or in response to successful authentication using the new password), the portal module 425 may replace the stored password with the new password.

In certain embodiments, the portal module 425 may detect authentication failure when logging in to a resource/portal associated with a candidate credential and may revert the password of the candidate credential to the old stored password in response to the authentication failure. For example, the portal module 425 may delete the new password 325 of a credential entry 305 in the credential dataset 300 in response to authentication failure when using the new password at the portal 320.

The hash module 430, in one embodiment, is configured to create a hash value of the password and/or username. As discussed above, a password manager may store the password of a credential as a hash value. In certain embodiments, the username may also be stored as a hash value. In such embodiments, identifying the set of candidate credentials may include the candidate module 415 identifying credentials with the same username as the first credential (i.e., the updated credential) and the hash module 430 and/or candidate module 415 comparing a hash value of the first stored password (i.e., the old password that was updated) to password hash values of those credentials having usernames that match the first username. Where the username is also stored as a hash value, identifying the set of candidate credentials may include the hash module 430 and/or candidate module 415 comparing a stored hash value of the username of a stored credential to a hash value of the first username.

The prompt module 435, in one embodiment, is configured to present one or more prompts to the user for updating the candidate credentials. In certain embodiments, the prompt module 435 may present a list of the candidate credentials to the user. Upon receiving confirmation from the user, the prompt module 435 and/or update module 420 may then replace the stored password with the new password for the set of candidate credentials. In certain embodiments, the prompt module 435 may receive a user-selection of a (second) set of the candidate credentials in response to presenting the list of candidate credentials. Note that the second set may be a subset of the presented list of candidate credentials. In such embodiments, updating the set of candidate credentials may include the prompt module 435 and/or update module 420 replacing the stored password with the new password for the user-selected set of the candidate credentials.

The group module 440, in one embodiment, is configured to mark credentials as part of a password group. For example, the group module 440 may mark the above discussed user-selected set of the candidate credentials as part of a password group. As discussed with reference to FIG. 3, the group module 440 may use a flag (e.g., one-bit) or group identifier to indicate that the user-selected set of the candidate credentials is part of a password group.

In various embodiments, the update module 420 may automatically replace a stored (old) password with the new password for each candidate credential marked as part of a password group. In certain embodiments, the group module 440 may mark one or more credentials as independent credentials, thus not part of a password group. In such embodiments, identifying the set of candidate credentials comprises ignoring those credentials marked as independent.

Figure 5A:
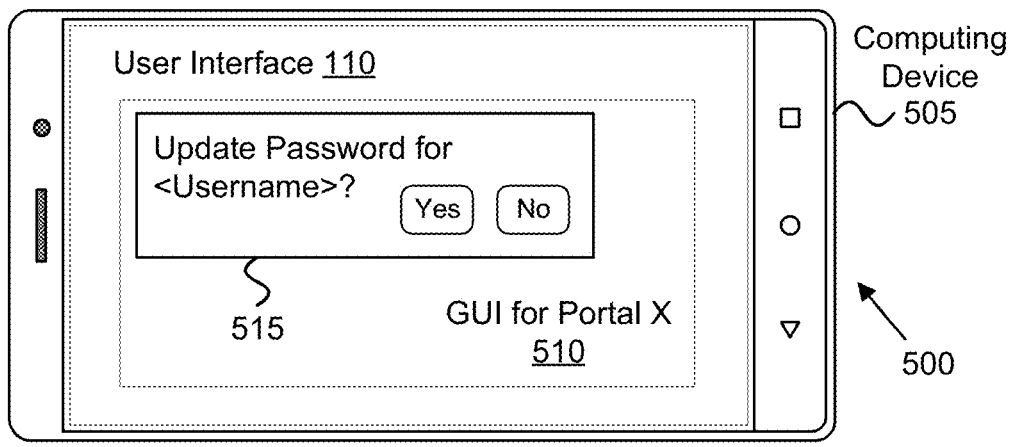
FIG. 5A is a diagram illustrating a first scenario of updating the password of a credential with a matching username at a first moment.
Figure 5B:
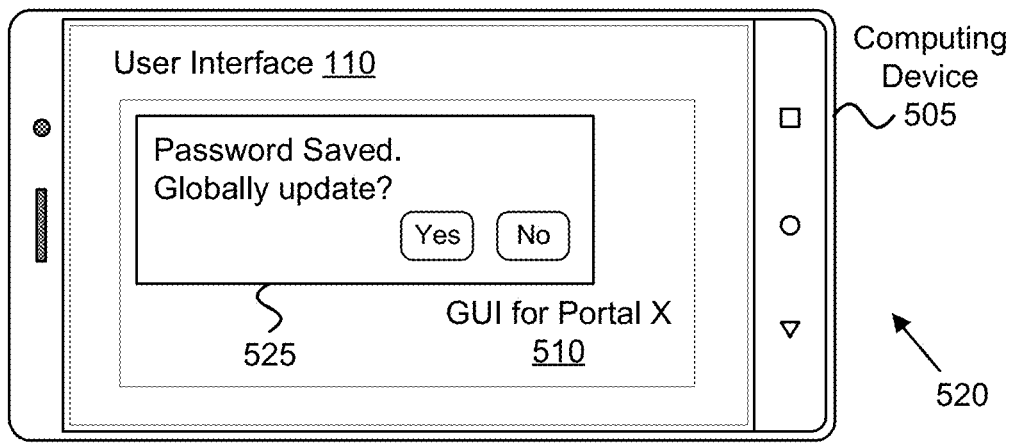
FIG. 5B is a diagram illustrating a first scenario of updating the password of a credential with a matching username at a second moment.
Figure 5C:
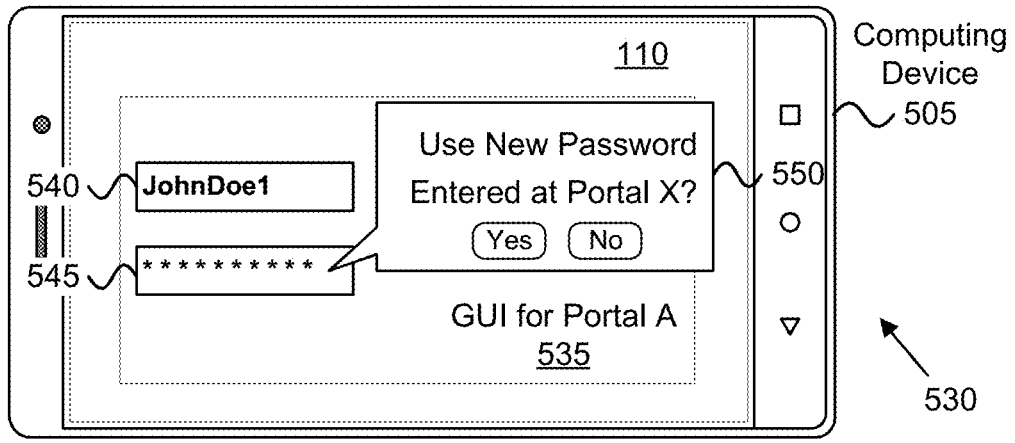
FIG. 5C is a diagram illustrating a first scenario of updating the password of a credential with a matching username at a third moment.

FIGS. 5A-5C depict a first scenario of updating the password of a credential with a matching username, according to embodiments of the disclosure. The first scenario involves a computing device 505, which may be an embodiment of the electronic device 105 and/or the electronic device 200. In various embodiments, the computing device 505 includes a password module 225 and/or a credential manager 400. The computing device 505 includes a user interface 110 (e.g., displayed on a touchscreen) configured to allow a user to authenticate herself using an authentication portal.

FIG. 5A depicts a first moment 500 of the first scenario. Here, the computing device 505 displays (via the user interface 110) a first GUI (graphical user interface) 510 for a first authentication portal, denoted as "Portal X". The user logs into Portal X and updates a password for Portal X, e.g., by entering a new password. Accordingly, the computing device 505 presents a first prompt 515 asking the user whether the credential for Portal X is to be updated. In the depicted embodiment, the computing device 505 asks whether to update the password for the username of the credential. Note that the first prompt 515 may include one or more UI elements allowing the user to confirm whether the store credentials to be updated.

FIG. 5B depicts a second moment 520 of the first scenario. Here, the user has confirmed that the credential for Portal X is to be updated. The computing device 505 then presents a second prompt 525 asking whether a global password update should be performed. Note that the second prompt 525 may include one or more UI elements allowing the user to confirm whether global password update is to be performed.

If the user confirms (e.g., by selecting "yes"), then the computing device 505 identifies a set of stored candidate credentials having the same username is the updated credential and storing the same password as the old password of the credential for Portal X (now updated). Alternatively, the set of candidate credentials may be identified prior to the computing device 505 presenting the second prompt 525. Identifying the set of stored candidate credentials as described above with reference to FIGS. 1-4.

If the user confirms the global password update, then the computing device 505 updates the candidate credentials to store the new password (i.e., the updated password for credential Portal X). Here, the new password may be stored alongside the old password for each candidate credential.

FIG. 5C depicts a third moment 530 of the first scenario. Here, the user 120 has confirmed the global password update and has now accessed a new authentication portal, denoted as "Portal A." Here Portal A is an authentication portal associated with one of the candidate credentials identified during the global password update. The computing device 505 displays (via the user interface 110) a second GUI 535 for Portal A. the second GUI 535 includes a username field 540 and the password field 545. In the depicted embodiment, the computing device 505 automatically populates username field 540 and the password field 545 using the stored credential for Portal A, e.g., with stored username "JohnDoe1" and the new password stored with the credential for Portal A during the global password update.

Here, the computing device 505 presents a third prompt 550 asking whether the new password (e.g., the password updated at Portal X) should be used to log into Portal A. note that the third prompt 550 may include one or more UI elements allowing the user to confirm whether the new password should be used at Portal A. If the user confirms that the new password is to be used, then the computing device 505 may delete the old password from the store credential for Portal A. If the user indicates that the new password is not to be used at Portal A, then the computing device 505 may delete the new password and revert to using the old password at Portal A.

Figure 6A:
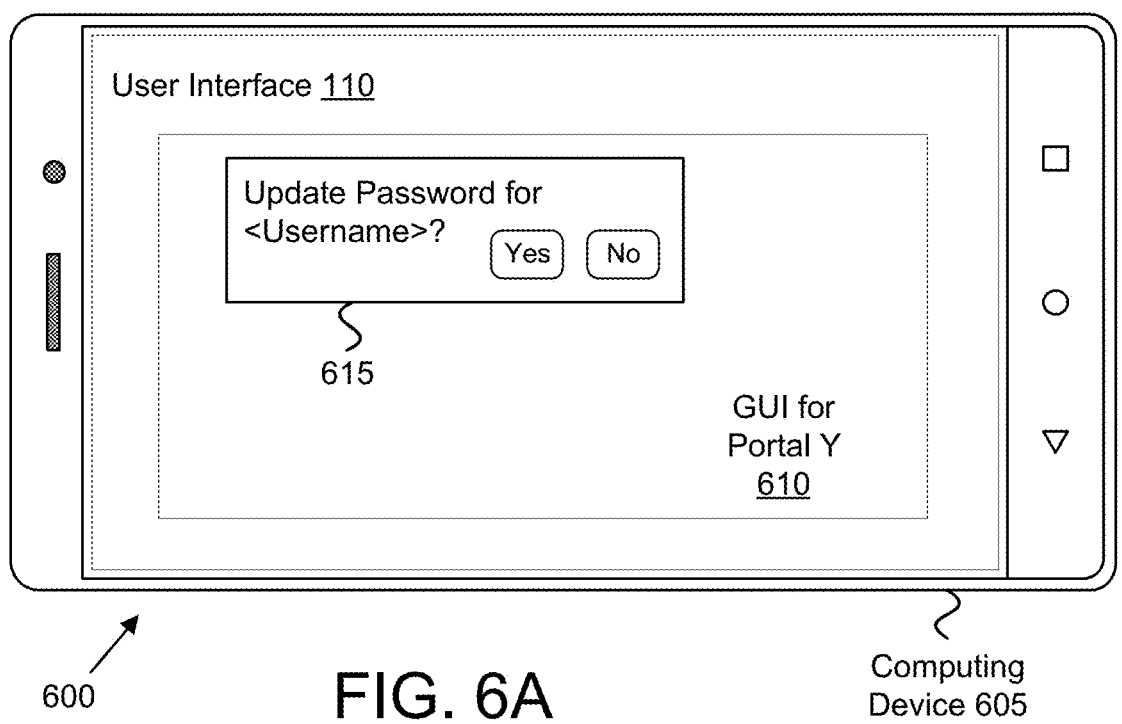
FIG. 6A is a diagram illustrating a second scenario of updating the password of a credential with a matching username at a first moment.
Figure 6B:
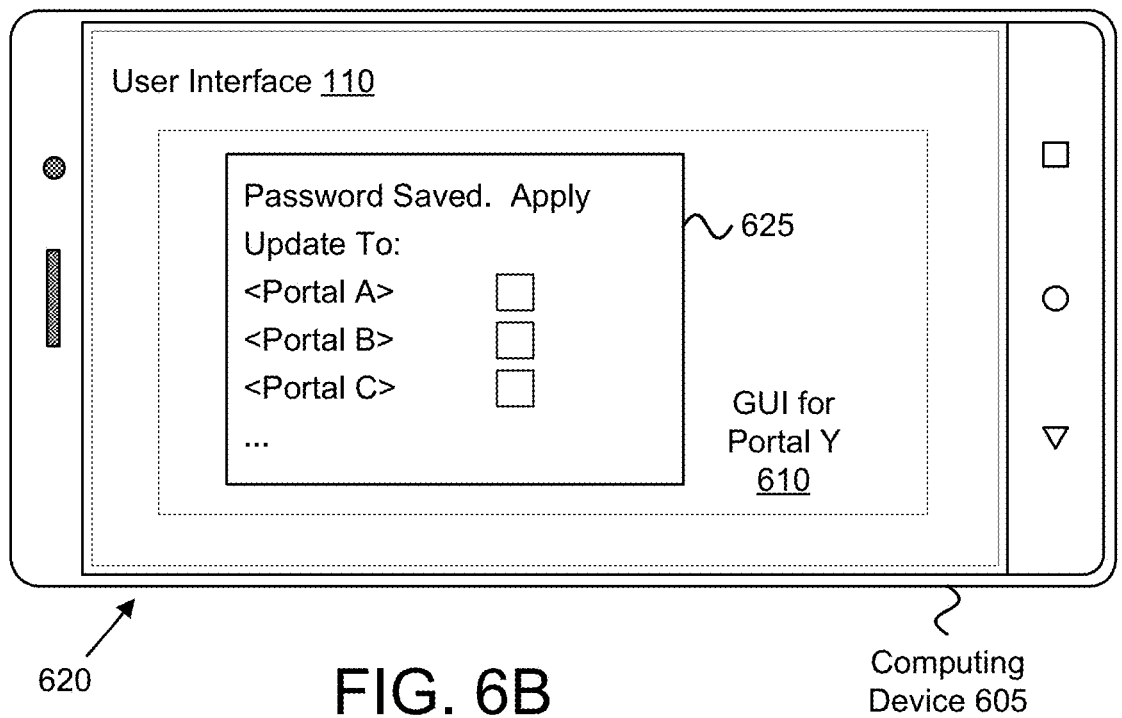
FIG. 6B is a diagram illustrating the second scenario of updating the password of a credential with a matching username at a second moment.

FIGS. 6A-6B depict a second scenario of updating the password of a credential with a matching username, according to embodiments of the disclosure. The second scenario involves a computing device 605, which may be an embodiment of the electronic device 105 and/or the electronic device 200. In various embodiments, the computing device 605 includes a password module 225 and/or a credential manager 400. The computing device 605 includes a user interface 110 (e.g., displayed on a touchscreen) configured to allow a user to authenticate herself using an authentication portal.

FIG. 6A depicts a first moment 600 of the second scenario. Here, the computing device 605 user has logged into Portal Y (e.g., via GUI 610 for Portal Y) and updated the password for Portal Y, e.g., by entering a new password. Accordingly, the computing device 605 presents a first prompt 615 asking the user whether the credential for Portal Y is to be updated. Note that the first prompt 615 may include one or more UI elements allowing the user to confirm whether the store credentials to be updated.

FIG. 6B depicts a second moment 620 of the second scenario. Here, the user has confirmed that the credential for Portal Y is to be updated and the computing device 605 has identified a set of stored candidate credentials having the same username is the updated credential and storing the same password as the old password of the credential for Portal Y (now updated). The computing device 605 then presents a second prompt 625 for global password update, where the second prompt 625 includes a list of portals associated with the candidate credentials. Note that the second prompt 625 may include one or more UI elements allowing the user to select one or more portals from the presented list and indicate that password update is to be performed for the candidate credentials associated with the selected portals.

If the user confirms the global update (e.g., by selecting the "update" element), then the computing device 605 updates the selected candidate credentials to store the new password (i.e., the updated password for credential Portal Y). Here, the new password may replace the old password for each candidate credential. Thereafter, when the user visits a little associated with the updated candidate credential, the new password is used to authenticate the user.

Figure 7:
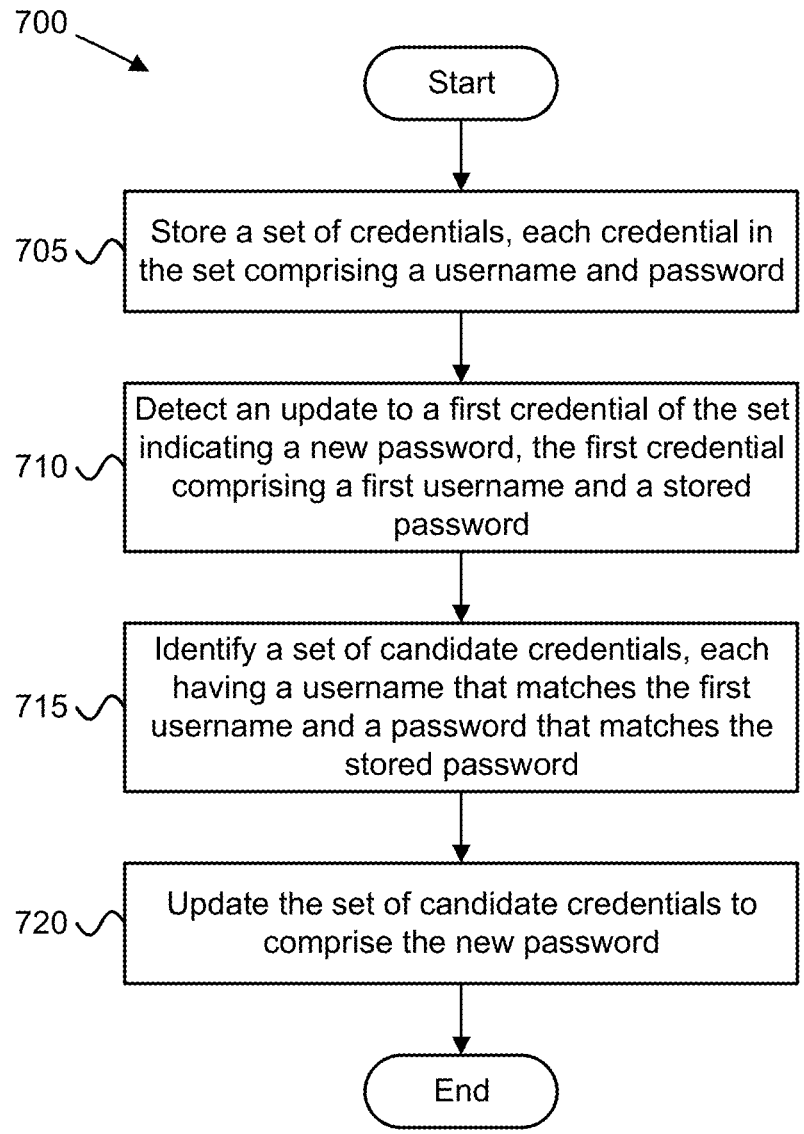
FIG. 7 is a flowchart diagram illustrating one embodiment of a method for updating the password of a credential with a matching username.

FIG. 7 depicts a method 700 for updating the password of a credential with a matching username, according to embodiments of the disclosure. In some embodiments, the method 700 is performed by the electronic device 105, the electronic device 200, the password module 225, and/or the credential manager 400, described above. In some embodiments, the method 700 is performed by a processor, such as a microcontroller, a microprocessor, a CPU, a GPU, an auxiliary processing unit, a FPGA, or the like.

The method 700 begins and stores 705 a set of credentials. Here, each credential in the set comprising a username and password. In certain embodiments, storing 705 the set of credentials comprises storing the password of a credential as a hash value. In certain embodiments, storing 705 the set of credentials comprises storing the username of a credential as a hash value.

The method 700 includes detecting 710 an update to a first credential of the set of credentials, the first credential comprising a first username and a first stored password. Here, the update to the first credential indicates a new password to be associated with the first username.

The method includes identifying 715 a set of candidate credentials, each candidate credential having a username that matches the first username and a password that matches the stored password. In various embodiments, the candidate credentials are associated with different portals.

In certain embodiments, identifying 715 the set of candidate credentials comprises comparing a stored hash value of a credential having a username that matches the first username to a hash value of the first stored password. In certain embodiments, identifying the set of candidate credentials comprises comparing a stored hash value of the username of a stored credential to a hash value of the first username.

In certain embodiments, at least one credential is marked as an independent credential. In such embodiments, identifying 715 the set of candidate credentials comprises ignoring the second credential.

The method 700 includes updating 720 the set of candidate credentials to comprise the new password. The method 700 ends. In some embodiments, updating 720 the set of candidate credentials the set of candidate credentials includes storing both the new password and a stored password. Here, when the user visits a portal associated with a candidate credential, the user may be informed that an updated password is available and prompted whether to utilize the new password (or to retain the old password). In such embodiments, updating 720 the set of candidate credentials includes replacing the stored password with the new password for the set of candidate credentials in response to receiving user confirmation to utilize the new password with the visited portal. In certain embodiments, updating 720 the set of candidate credentials includes detecting authentication failure when logging in to a resource associated with a candidate credential and reverting to the stored password in response to the authentication failure.

In some embodiments, updating 720 the set of candidate credentials includes presenting a list of the candidate credentials to the user and receiving confirmation from the user to replace the stored password with the new password for the set of candidate credentials. In such embodiments, updating 720 the set of candidate credentials may include replacing the stored password with the new password for a user-selected subset of the candidate credentials.

In some embodiments, one or more of the candidate credentials may be marked as part of a password group. In such embodiments, updating 720 the set of candidate credentials comprises automatically replacing the stored password with the new password for each candidate credential marked as part of a password group.

Figure 8:
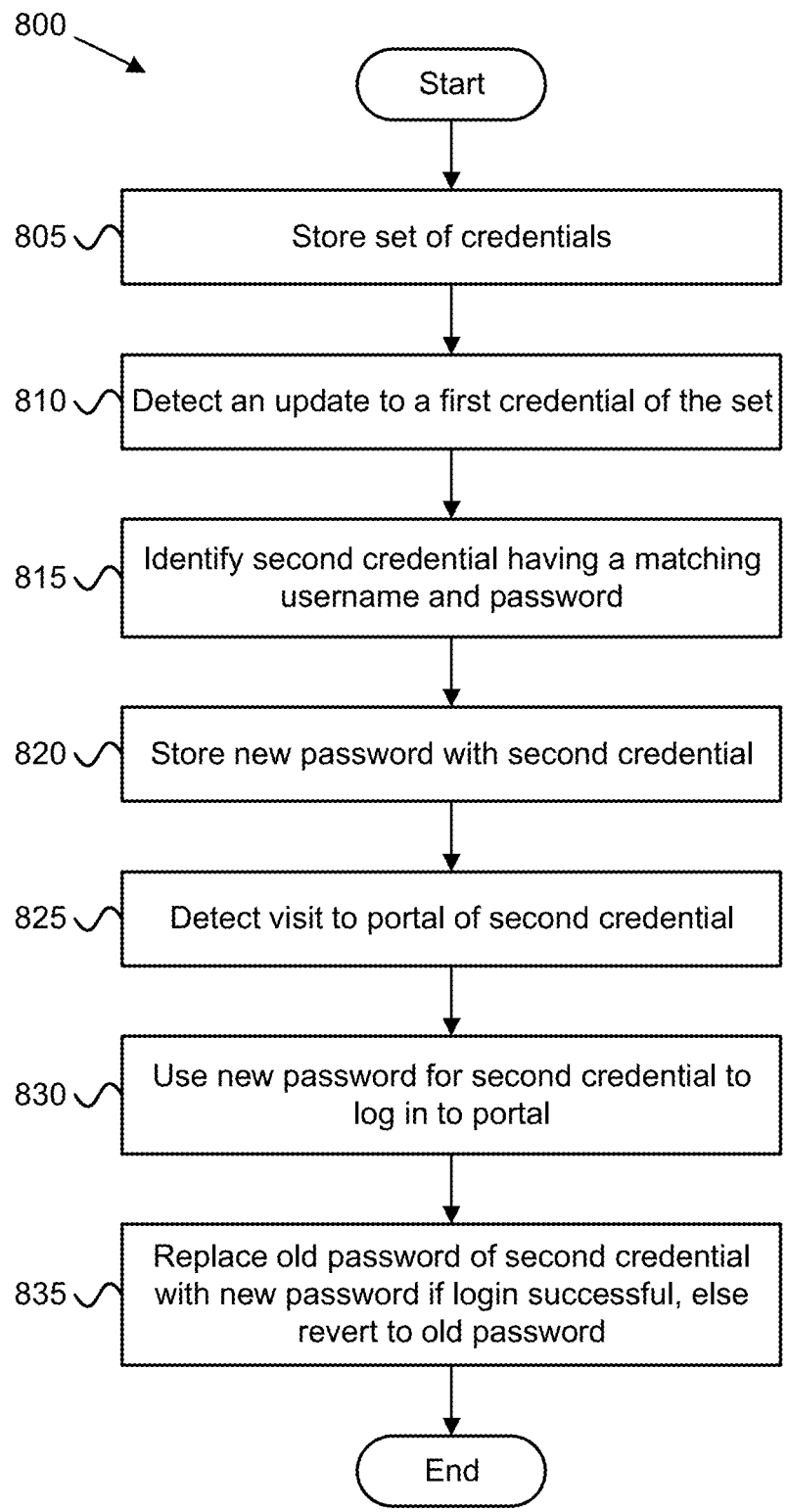
FIG. 8 is a flowchart diagram illustrating another embodiment of a method for updating the password of a credential with a matching username.

FIG. 8 depicts a method 800 for updating the password of a credential with a matching username, according to embodiments of the disclosure. In some embodiments, the method 800 is performed by the electronic device 105, the electronic device 200, the password module 225, and/or the credential manager 400, described above. In some embodiments, the method 800 is performed by a processor, such as a microcontroller, a microprocessor, a CPU, a GPU, an auxiliary processing unit, a FPGA, or the like.

The method 800 begins and stores 805 a set of credentials. Here, each credential of the set has a username and password. Each credential of the set is also associated with a specific portal (e.g., authentication portal), which may be a server, a website, or other resource. The method 800 includes detecting 810 an update to a first credential of the set, the update comprising a new password for the first credential. The method 800 includes identifying 815 a second credential having a matching username and password as the first credential (e.g., matching the old password associated with the first credential). The method 800 includes storing 820 the new password with the second credential.

The method 800 includes detecting 825 a visit to a portal of the second credential. The method 800 includes using 830 the new password stored with the second credential to log into the portal. The method 800 includes replacing 835 the old password of the second credential with the new password if the login in successful, otherwise reverting to the old password if the login is unsuccessful. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that:
 stores a plurality of credentials, each credential in the plurality of credentials comprising a username and a password; and
 stores code executable by the processor to:
  detect an update to a first credential of the plurality of credentials, the first credential comprising a first username and a first stored password, wherein the update to the first credential changes the first stored password to a new password to be associated with the first username;
  identify one or more second credentials in the plurality of credentials to define a set of candidate credentials, wherein each second credential is identified as a candidate credential by being a credential in the plurality of credentials that includes:
   a second username that matches the first username, and a second stored password that matches the first stored password; and update each second credential in the set of candidate credentials to comprise the same new password as the first credential by changing each second stored password to the new password and associating the new password with each second username for each second credential.

2. The apparatus of claim 1, wherein the candidate credentials are associated with different portals.

3. The apparatus of claim 2, wherein updating each candidate credential in the set of candidate credentials comprises:

storing both the new password and the second stored password;

prompting the user to utilize the new password in response to visiting a portal associated with a candidate credential; and replacing the second stored password with the new password for the set of candidate credentials in response to receiving user confirmation to utilize the new password with the visited portal.

4. The apparatus of claim 1, wherein storing the set of credentials comprises storing the password of a credential as a hash value, and wherein identifying the set of candidate credentials comprises comparing a stored hash value of a credential including a second username that matches the first username to a hash value of the first stored password.

5. The apparatus of claim 1, wherein storing the set of credentials comprises storing the username of a credential as a hash value, and wherein identifying the set of candidate credentials comprises comparing a stored hash value of the username of a stored credential to a hash value of the first username.

6. The apparatus of claim 1, wherein updating each candidate credential in the set of candidate credentials comprises:

presenting a list of the candidate credentials to the user; and receiving confirmation from the user to replace the second stored password with the new password for the set of candidate credentials.

7. The apparatus of claim 6, wherein the processor receives a user-selection of a subset of the candidate credentials in response to presenting the list of candidate credentials, and wherein updating each candidate credential in the set of candidate credentials further comprises replacing the second stored password with the new password for the user-selected subset of the candidate credentials.

8. The apparatus of claim 1, wherein the processor marks the candidate credentials as part of a password group, and wherein updating each candidate credential in the set of candidate credentials comprises automatically replacing the second stored password with the new password for each candidate credential marked as part of a password group.

9. The apparatus of claim 1, wherein the processor marks a second credential as an independent credential, and wherein identifying the set of candidate credentials comprises ignoring the second credential.

10. The apparatus of claim 1, wherein updating each candidate credential in the set of candidate credentials comprises:

storing both the new password and the second stored password;

detecting authentication failure when logging in to a resource associated with a candidate credential; and reverting to the second stored password in response to the authentication failure.

11. A method comprising:

storing, by use of a processor, a plurality of credentials, each credential in the plurality of credentials comprising a username and a password, wherein the credentials are each associated with different portals;

detecting an update to a first credential of the plurality of credentials, the first credential comprising a first username and a first stored password, wherein the update to the first credential changes the first password to a new password to be associated with the first username;

identifying one or more second credentials in the plurality of credentials to define a set of candidate credentials, wherein each second credential is identified as a candidate credential by being a credential in the plurality of credentials that includes:

a second username that matches the first username, and a second stored password that matches the first stored password; and updating each second credential in the set of candidate credentials to comprise the same new password as the first credential by changing each second stored password to the new password and associating the new password with each second username for each second credential.

12. The method of claim 11, wherein the candidate credentials are associated with different portals and wherein updating the set of candidate credentials comprises:

storing both the new password and the second stored password;

prompting the user to utilize the new password in response to visiting a portal associated with a candidate credential; and replacing the second stored password with the new password for the set of candidate credentials in response to receiving user confirmation to utilize the new password with the visited portal.

13. The method of claim 11, wherein storing the set of credentials comprises storing the password of a credential as a hash value, and wherein identifying the set of candidate credentials comprises comparing a stored hash value of a credential having a second username that matches the first username to a hash value of the first stored password.

14. The method of claim 11, wherein storing the set of credentials comprises storing the username of a credential as a hash value, and wherein identifying the set of candidate credentials comprises comparing a stored hash value of the username of a stored credential to a hash value of the first username.

15. The method of claim 11, wherein updating each candidate credential in the set of candidate credentials comprises:

presenting a list of the candidate credentials to the user; and receiving confirmation from the user to replace the second stored password with the new password for the set of candidate credentials.

16. The method of claim 15, further comprising receiving a user-selection of a subset of the candidate credentials in response to presenting the list of candidate credentials, wherein updating each candidate credential in the set of candidate credentials further comprises replacing the second stored password with the new password for the user-selected subset of the candidate credentials.

17. A program product comprising a computer-readable storage medium that stores code executable by a processor, the executable code comprising code that:
- stores a plurality of credentials, each credential in the plurality of credentials comprising a username and a password, wherein the credentials are each associated with different portals;
- detects an update to a first credential of the plurality of credentials, the first credential comprising a first username and a first stored password,
  - wherein the update to the first credential changes the first stored password to a new password to be associated with the first username;
    - identifies one or more second credentials in the plurality of credentials to define a set of candidate credentials, wherein each second credential is identified as a candidate credential by being a credential in the plurality of credentials that includes:
      - a second username that matches the first username, and
      - a second stored password that matches the first stored password; and
- updates each second credential in the set of candidate credentials to comprise the same new password as the first credential by changing each second stored password to the new password and associating the new password with each second username for each second credential.

18. The program product of claim 17, wherein the processor marks the candidate credentials as part of a password group, and wherein updating each candidate credential in the set of candidate credentials comprises automatically replacing the second stored password with the new password for each candidate credential marked as part of a password group.

19. The program product of claim 17, wherein the processor marks a second credential as an independent credential, and wherein identifying the set of candidate credentials comprises ignoring the second credential.

20. The program product of claim 17, wherein updating each candidate credential in the set of candidate credentials comprises:
- storing both the new password and the second stored password;
- detecting an authentication failure when logging in to a resource associated with a candidate credential; and
- reverting to the second stored password in response to the authentication failure.

* * * * *